United States Patent [19]

Dickens

[11] Patent Number: 5,662,723
[45] Date of Patent: Sep. 2, 1997

[54] APPARATUS AND METHOD FOR FORMING A DECORATIVE PATTERN ON GLASSWARE HAVING AN EDGE

[75] Inventor: Robert R. Dickens, Toledo, Ohio

[73] Assignee: Libbey Glass Inc., Toledo, Ohio

[21] Appl. No.: 620,595

[22] Filed: Mar. 22, 1996

[51] Int. Cl.⁶ .......................... C03B 23/00; C03B 23/09
[52] U.S. Cl. ..................... 65/104; 65/29.18; 65/105;
65/108; 65/113; 65/160; 65/268; 65/278;
65/295; 65/296; 65/299
[58] Field of Search .................. 65/29.18, 104,
65/105, 108, 113, 160, 268, 278, 295, 296, 299

[56] References Cited

U.S. PATENT DOCUMENTS

| | | | |
|---|---|---|---|
| 285,345 | 1/1883 | Dietrich | 65/295 |
| 327,406 | 9/1885 | Northwood | 65/296 |
| 358,724 | 3/1887 | Blumenberg | 65/296 |
| 406,693 | 7/1889 | Atterbury | 65/299 |
| 1,390,626 | 9/1921 | Lindahl | 65/113 |
| 1,721,983 | 7/1929 | Bailey | 65/299 |
| 1,786,456 | 12/1930 | Rohl | 65/299 |
| 1,798,903 | 3/1931 | Rolston | 65/295 |
| 3,177,059 | 4/1965 | Benard | 65/113 |
| 3,188,189 | 6/1965 | Leeuw | 65/113 |
| 3,726,659 | 4/1973 | Banyas et al. | 65/113 |
| 3,734,704 | 5/1973 | Fike | 65/69 |
| 4,375,669 | 3/1983 | Johnson et al. | 364/473 |
| 4,572,732 | 2/1986 | Gomez-Sanchez et al. | 65/271 |

Primary Examiner—Donald E. Czaja
Assistant Examiner—Sean Vincent
Attorney, Agent, or Firm—Emch, Schaffer, Schaub & Porcello Co., L.P.A.

[57] ABSTRACT

An apparatus and method for forming a decorative pattern on glassware having an edge that includes a base, a forming tool, actuation means and control means. The forming tool is mounted on the base. The tool is moveable between a first position and a second position. The tool engages the edge of the glassware at the second position to form the decorative pattern on the edge. The actuation and control means move the tool from the first position to the second position. The method of the invention includes the steps of (a) moving the glassware along a predetermined path; (b) heating the edge; and (c) engaging the edge with a forming tool as the tool is being moved along the predetermined path to form the decorative pattern on the edge of the glassware.

17 Claims, 9 Drawing Sheets

APPARATUS AND METHOD FOR FORMING A DECORATIVE PATTERN ON GLASSWARE HAVING AN EDGE

BACKGROUND OF THE INVENTION

The present invention relates to forming a decorative pattern on glassware having an edge. More specifically, the present invention is directed to an apparatus and method for forming a decorative pattern on the edge of glassware during the production process.

As part of the process for manufacturing glassware, formed glassware is moved to a moil burnoff spindle machine. Conventional spindle machines include 24 or 36 spindles. The spindles include vacuum chucks that receive and hold the glassware as the spindle machine rotates. The moil or undesired portion of the glassware is burned off by a flame and discarded in the spindle machine.

It has been found that there is a need for a device that can form a decorative pattern on the edge of glassware prior to annealing while the glassware is being rotated by the moil burnoff spindle machine. In a prior art process, decorative patterns were formed after the time of annealing. In this process, the edge of a piece of glassware was heated after annealing, and the molten glass was allowed to flow onto a forming tool in the shape of the decorative pattern. This process was inefficient because it resulted in a high percentage of breakage. The present invention eliminates this problem.

It has also been found that there is a need for a small, portable and relatively inexpensive decorative pattern forming assembly that can be used with any conventional moil burnoff spindle machine. The present invention satisfies the above-identified needs.

SUMMARY OF THE INVENTION

The present invention is directed to an apparatus and method for forming a decorative pattern on glassware having an edge. The apparatus includes a forming tool mounted on a base adjacent a moil burnoff spindle machine. The forming tool is moveable between a first position and a second position. The forming tool engages the edge of the glassware at the second position to form the decorative pattern on the edge. The apparatus includes actuation means for moving the forming tool from the first position to the second position. The apparatus also includes control means for controlling the actuation means. The method of the present invention is directed to forming a decorative pattern on glassware having an edge. The method includes the steps of: (a) moving the glassware along a predetermined path; (b) heating the edge; (c) engaging the edge with a forming tool as the tool is being moved along the predetermined path to form the decorative pattern on the edge of the glassware.

The primary object of the present invention is to provide an efficient apparatus and method for forming a decorative pattern on glassware having an edge.

Other objects and advantages of the present invention shall become apparent to those skilled in the art upon a review of the following detailed description of the preferred embodiments and the accompanying drawings.

DETAILED DESCRIPTION OF THE PREFERRED EMBODIMENTS

Figure 1:
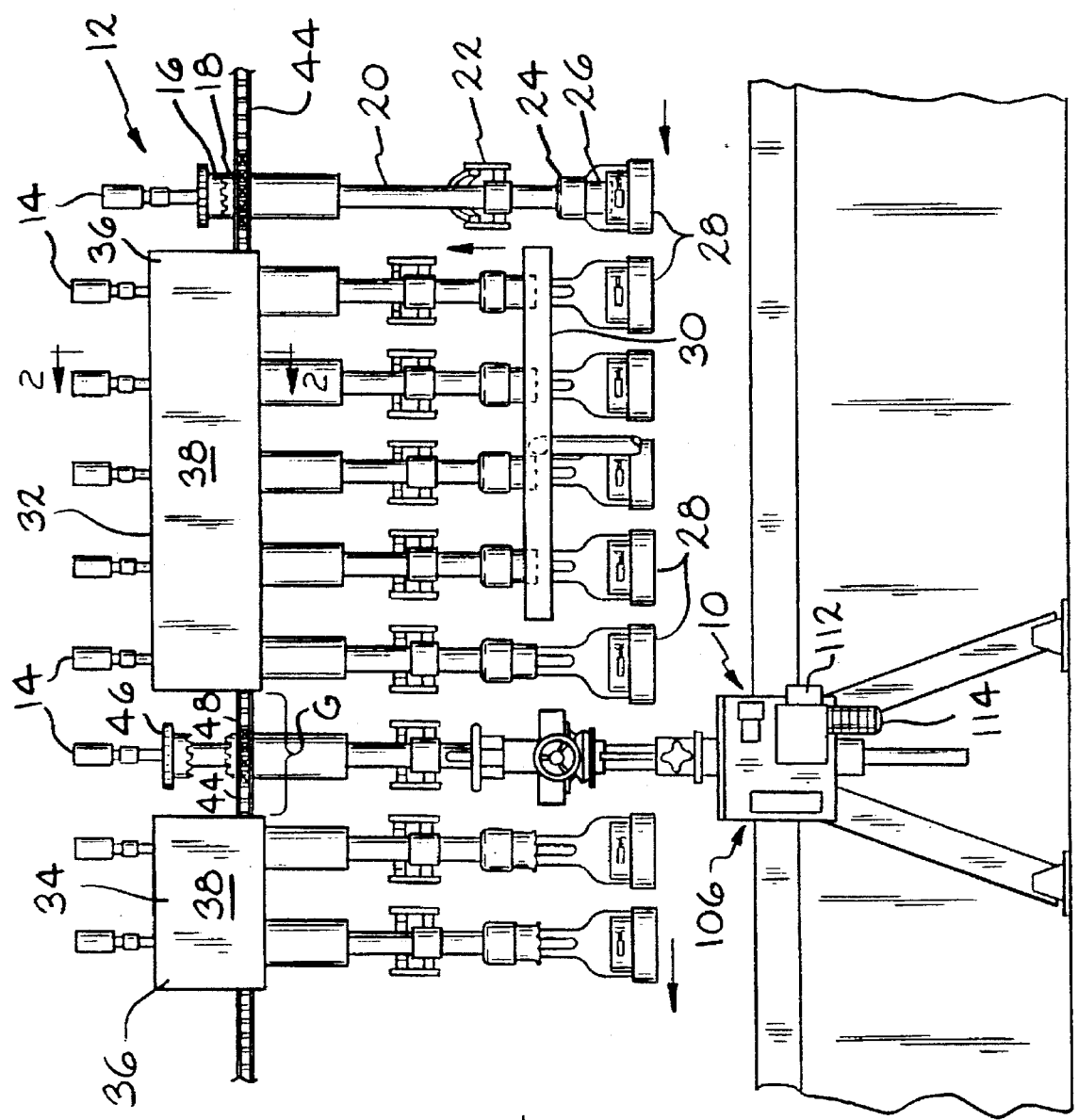
FIG. 1 is a front elevational view showing the apparatus for forming a decorative pattern on glassware having an edge according to the present invention adjacent a moil burnoff spindle machine.

The preferred embodiments and best mode of the present invention will now be described in detail with reference being made to the drawings. The apparatus for forming a decorative pattern on glassware having an edge is indicated generally in the drawings by the reference number "10".

Referring to FIG. 1, the apparatus 10 is shown adjacent a moil burnoff spindle machine 12. The spindle machine 12 includes a plurality of spindles 14. Conventional spindle machines include 24 or 36 spindles that are mounted in a circular arrangement. It should be understood that the present invention can be used with a variety of spindle machines or other devices depending on the application. A spindle 14 is rotated by meshing upper and lower teeth 16 and 18, respectively. A spindle 14 includes a shaft 20. A camming device 22 engages the shaft 20 to cause vertical movement of the spindle 14. The camming device 22 raises the spindle 14 as shown in FIG. 1. The spindle 14 includes a vacuum chuck 24 positioned on the end of the shaft 20. The vacuum chuck 24 is in communication with a source of negative pressure so that a piece of glassware 26 can be positioned and maintained within the vacuum chuck. A plurality of moil burners 28 are positioned adjacent the spindles 14. A moil burner 28 heats the glassware 26 to burn off the moil thus leaving an edge on the glassware.

Figure 3:
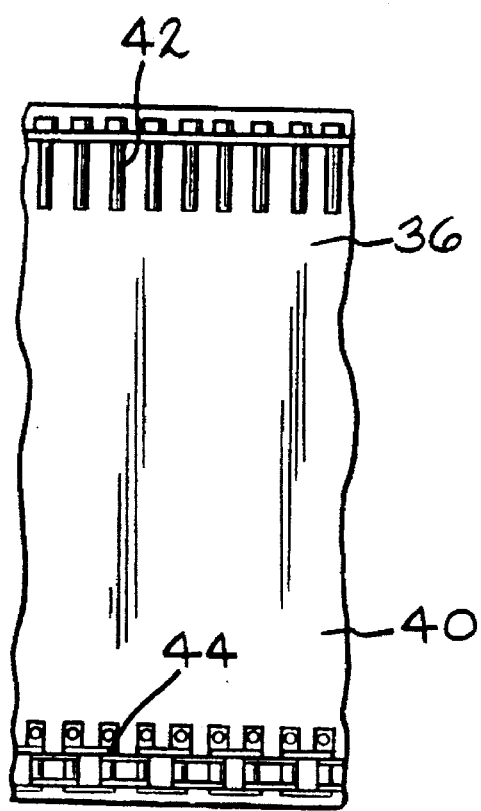
FIG. 3 is a cross sectional view taken through line 3—3 of FIG. 2.
Figure 2:
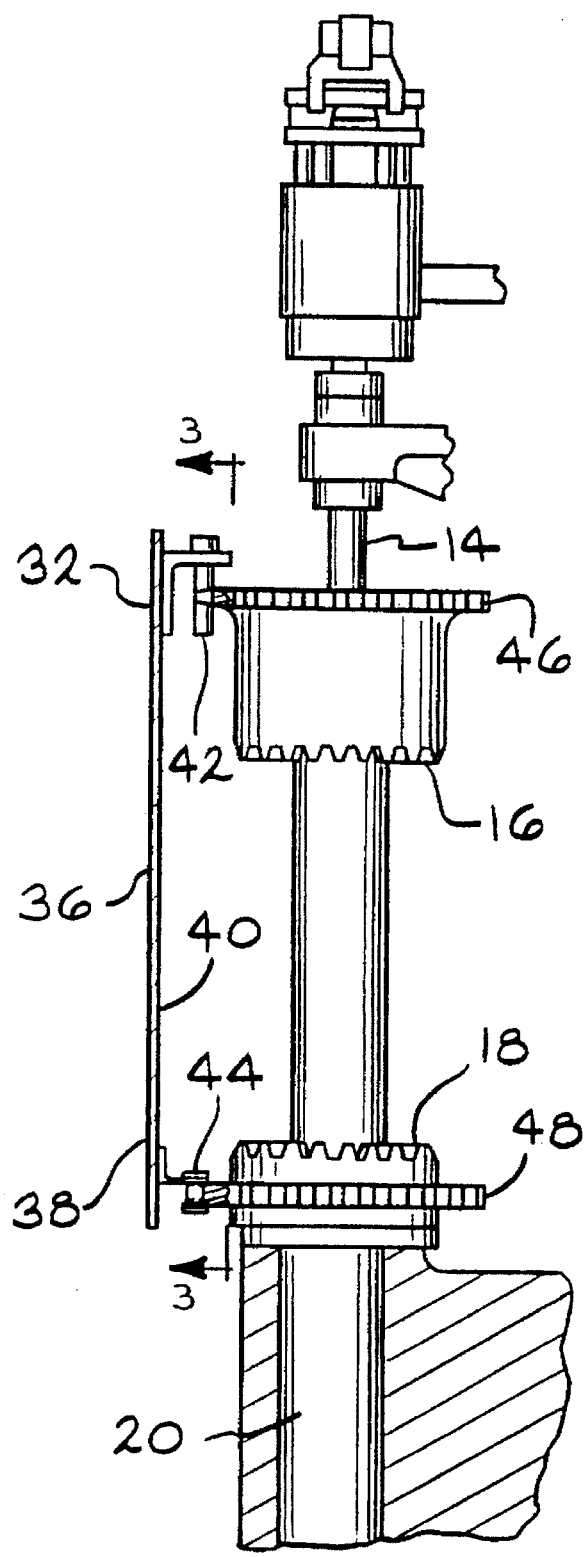
FIG. 2 is a cross sectional view taken through line 2—2 of FIG. 1 showing a spindle and a rotation plate according to the present invention.

In the present invention, an auxiliary edge heater 30 is positioned adjacent the conventional spindle machine 12 to heat the edge of the glassware 26 prior to engagement of the glassware with the apparatus 10. First and second rotation plates 32 and 34 are also positioned adjacent the conventional spindle machine 12. As shown in FIGS. 1, 2 and 3, the first and second rotation plates 32 and 34 each includes a cover plate 36 having a front surface 38 and a back surface 40. The back surface 40 includes a longitudinally extending row of pegs 42 and a longitudinally extending chain belt 44. As the spindle machine 12 rotates a spindle 14 next to the first and second rotation plates 32 and 34, the row of pegs 42 engages a first sprocket 46 and the chain belt 44 engages a second sprocket 48. This engagement of the first and second rotation plates 32 and 34 with a spindle 14 causes rotation of the spindle 14 even though the meshing upper and lower teeth 16 and 18 are disengaged. This allows the glassware 26 to continue to rotate as it passes the auxiliary burner 30. In the present embodiment, the glassware 26 is rotated between 2 to 4 times, with approximately 3 rotations being preferred, to fully heat the edge of the glassware 26 prior to decorative pattern formation. As shown in FIG. 1, there is a gap G between the first and second rotation plates 32 and 34 at the point where the spindle 14 is adjacent the apparatus 10. In the gap G, the spindle 14 ceases to rotate while a decorative pattern is being formed on the glassware 26.

As shown in FIG. 1, the camming device 22 lifts the spindle 14 in the vertical direction indicated by the arrow. This causes the glassware 26 to be positioned away from the stationary moil burner 28 after the moil has separated so that the glassware can be properly heated by the edge heater 30 and engaged by the apparatus 10 to form the decorative pattern.

Figure 4:
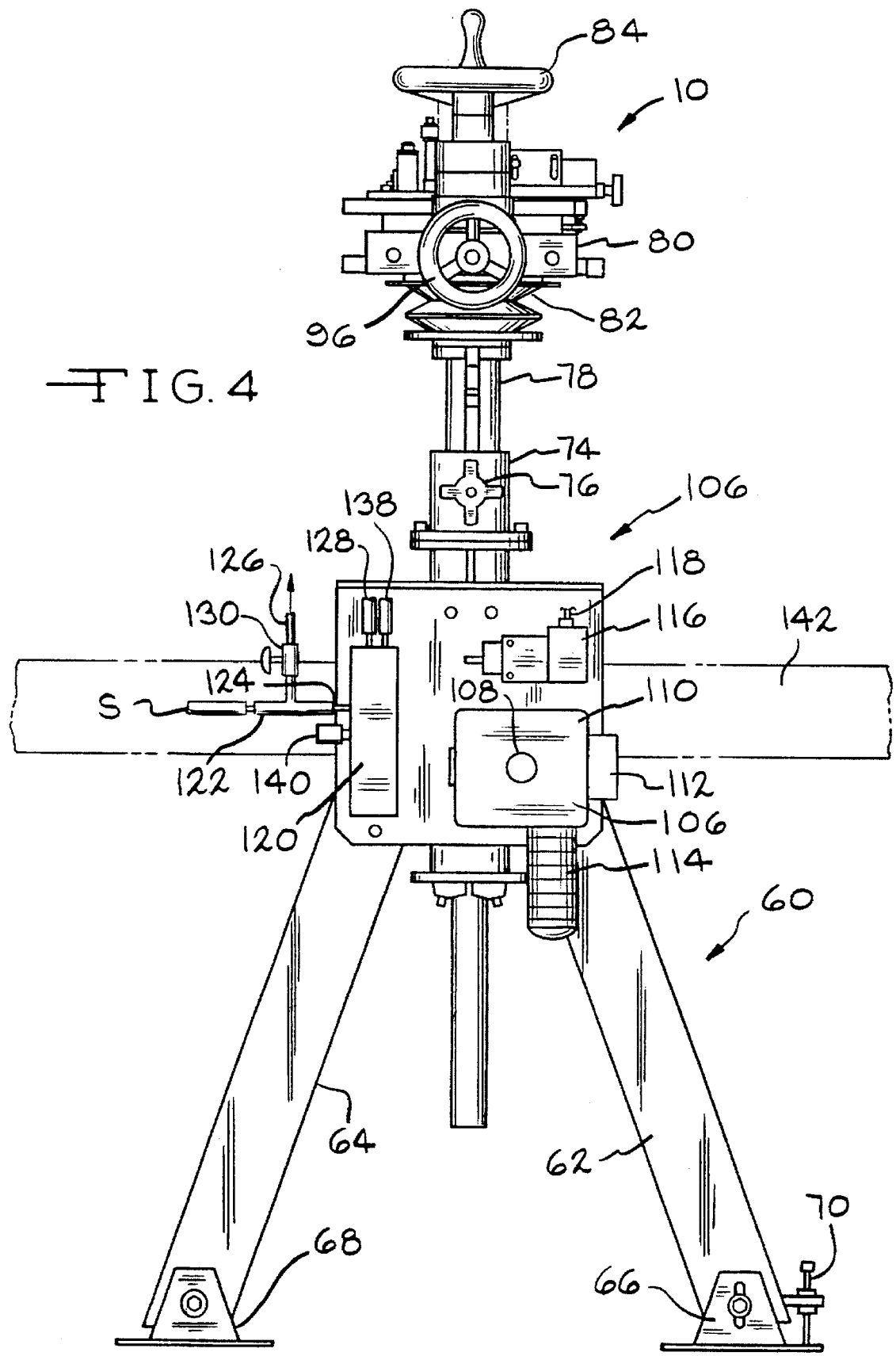
FIG. 4 is a front elevational view of the apparatus according to the present invention.
Figure 5:
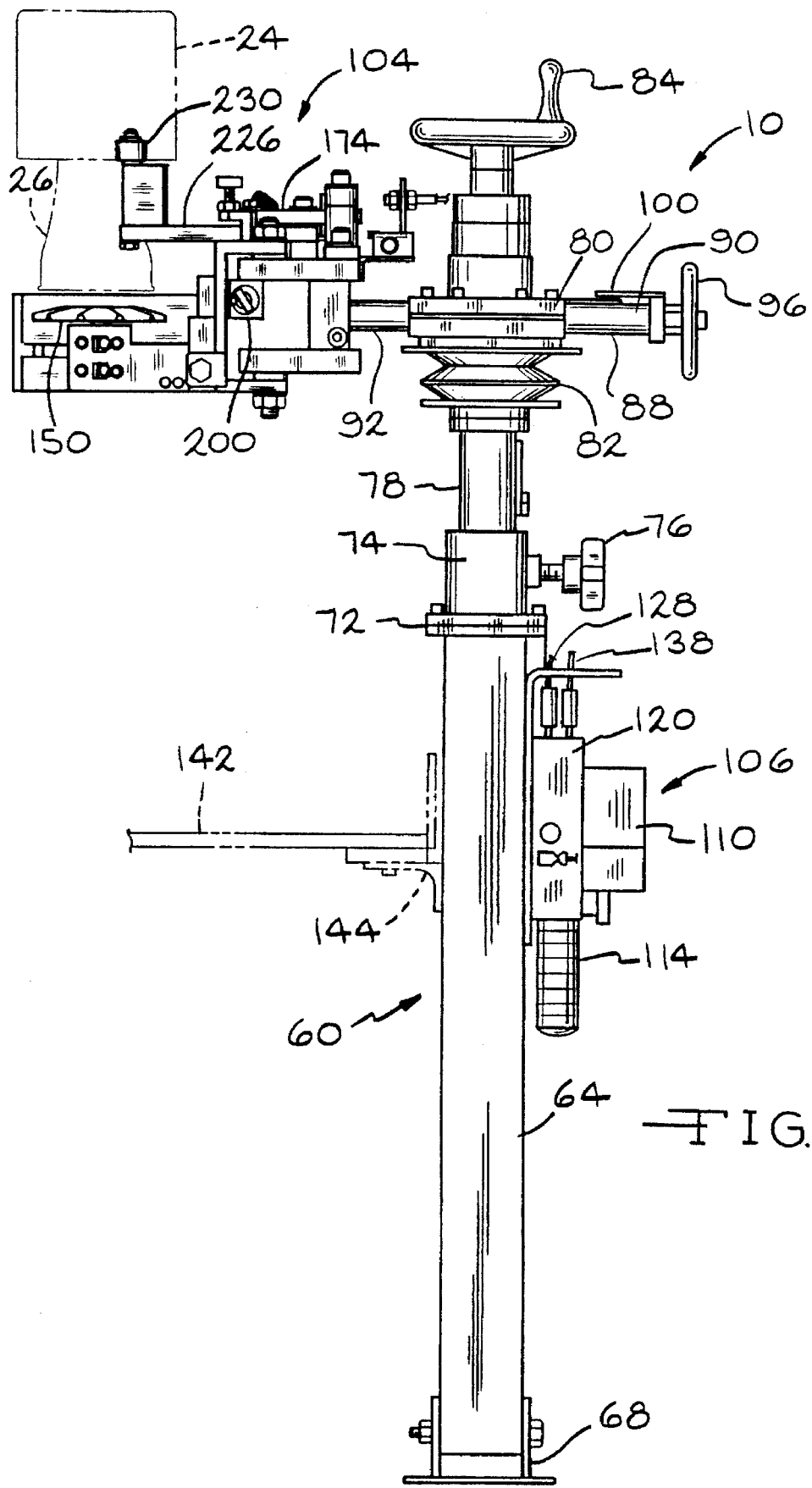
FIG. 5 is a side elevational view of the apparatus according to the present invention.
Figure 6:
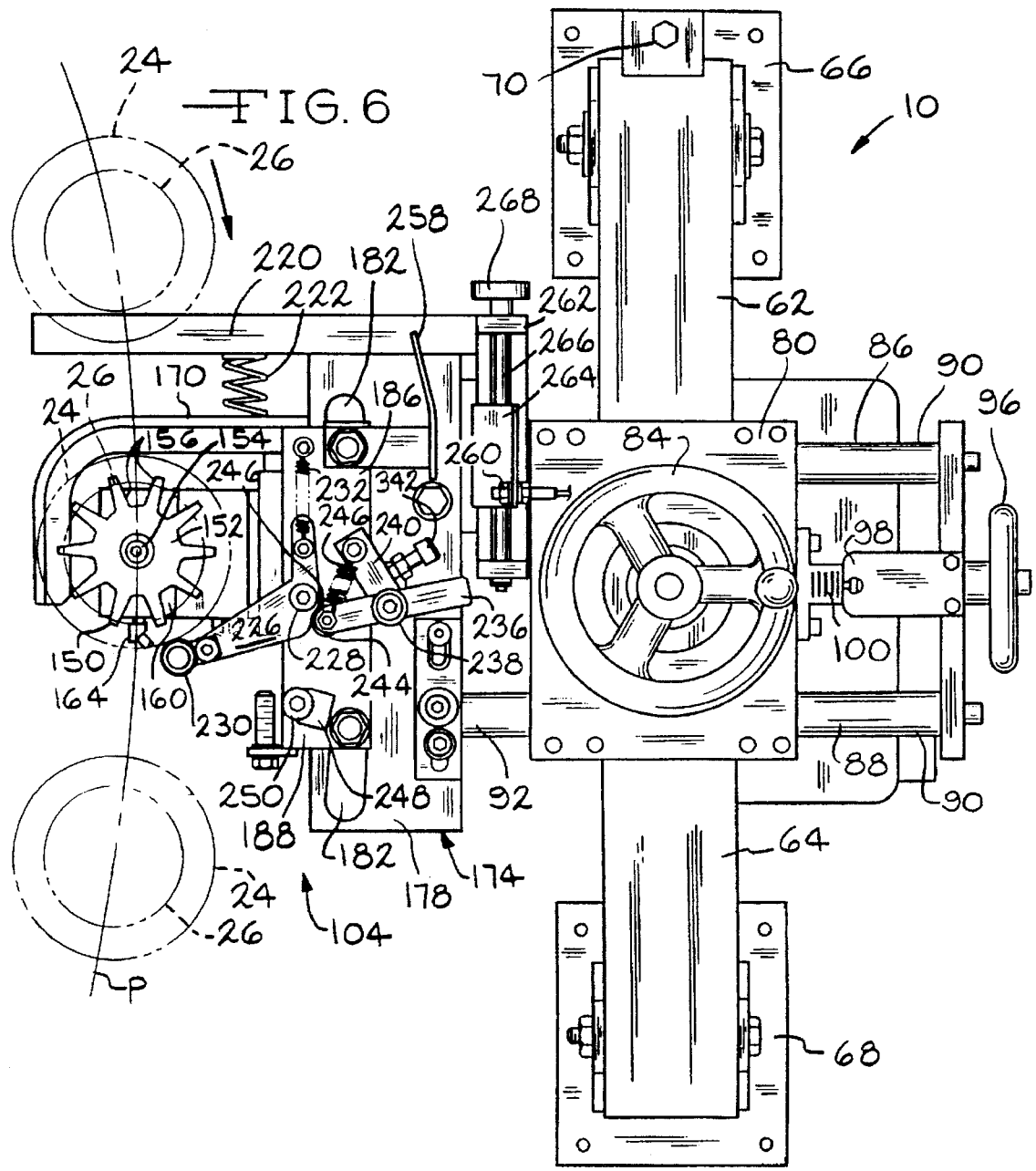
FIG. 6 is a top plan view of the apparatus according to the present invention.

Referring now to FIGS. 4, 5 and 6, the apparatus 10 includes a base 60 having a first leg 62 and a second leg 64. The first leg 62 is mounted on a first pivot mounting foot 66. The second leg 64 is mounted on a second pivot mounting foot 68. The mounting feet 66 and 68 are attached to a solid surface, such as a floor. The position of the leg 62 can be adjusted by a leveling screw 70. As shown in FIG. 5, the first and second legs 62 and 64 are joined together by a leg attachment plate 72. A vertical shaft guide 74 having a hand knob 76 is mounted on the leg attachment plate 72. The vertical shaft guide 74 receives a vertical shaft 78. The vertical shaft 78 can be moved vertically within the vertical shaft guide 74. The movement of the vertical shaft 78 can be restrained by turning the hand knob 76. A clamp block 80 is pivotally mounted on the vertical shaft 78 by a pivot assembly 82. The vertical shaft 78 is in operative communication with a vertical hand wheel 84. When the vertical hand wheel 84 is rotated, the vertical shaft 78 can be raised or lowered thus providing vertical movement of the clamp block 80. The pivot assembly 82 allows the clamp block 80 to be rotated away from the spindle machine 12 if the apparatus 10 is struck by a spindle 14 or other object during the decorative pattern formation process.

Referring to FIGS. 5 and 6, first and second horizontal shafts 86 and 88 are slidingly received by the clamp block 80. The first and second horizontal shafts 86 and 88 each includes a first end 90 and a second end 92. A horizontal hand wheel 96 is in communication with the first and second horizontal shafts 86 and 88. A horizontal adjustable shaft 98 extends inwardly from the horizontal hand wheel 96 to the clamp block 80. Rotation of the horizontal hand wheel 96 results in the horizontal movement of the first and second horizontal shafts 86 and 88 with respect to the clamp block 80. The relative movement of the shafts 86 and 88 and the clamp block 80 is indicated on the gauge 100. Referring to FIG. 6, the second ends 92 of the first and second horizontal shafts 86 and 88 are attached to a decorative pattern forming device 104. The relative movement of the glassware 26 along a predetermined path P with respect to the decorative pattern forming device 104 is indicated by the dashed lines and the arrow in FIG. 6. As described above, the vertical movement of the clamp block 80 and thus the decorative pattern forming device 104 can be adjusted using the vertical hand wheel 84. The horizontal movement of the first and second horizontal shafts 86 and 88 and thus the decorative pattern forming device 104 can be adjusted using the horizontal hand wheel 96. These adjustments can be made to properly position the decorative pattern forming device 104 with respect to the predetermined path P of the glassware 26.

Referring to FIGS. 4 and 5, a controls assembly 106 is mounted on the base 60. The controls assembly 106 includes an on/off push-button switch 108 mounted in a junction box 110. A warning horn 112 and a warning light 114 can be mounted on the junction box 110 to provide an acoustical and an optical indication, respectively, that the apparatus is malfunctioning. For example, the horn 112 and the light 114 can indicate that the apparatus 10 has been struck and pivoted away from a spindle 14 thereby interrupting the decorative pattern formation process.

Still referring to FIGS. 4 and 5, the controls assembly 106 further includes a sensor module 116 in communication with a fiber cable 118. As described below, the fiber cable 118 is in communication with a photoeye that senses the presence of a piece of glassware.

As shown in FIGS. 4 and 5, the controls assembly 116 further includes a pneumatic control valve 120. A pressurized air supply S is attached to a T-valve 122 having a first air inlet fitting 124 and a return cylinder inlet fitting 126. The flow of air from the first air inlet fitting 124 is regulated by the pneumatic control valve 120 to a corresponding second air inlet fitting 128, which is in communication with the decorative pattern forming device 104. The flow of air through the return cylinder inlet fitting 126 is regulated by a self-relieving regulator valve 130. The return cylinder inlet fitting 126 is in communication with the decorative pattern forming device 104. A first exhaust air fitting 138, which is in communication with the decorative pattern forming device 104, is in communication with a second exhaust air fitting 140 through the pneumatic control valve 120.

As shown in FIGS. 1, 4 and 5, the apparatus 10 is positioned adjacent a moil receiving pan 142 that is positioned under the spindle machine 12. As shown in FIG. 5, the apparatus 10 can be attached to the pan 142.

Figure 7:
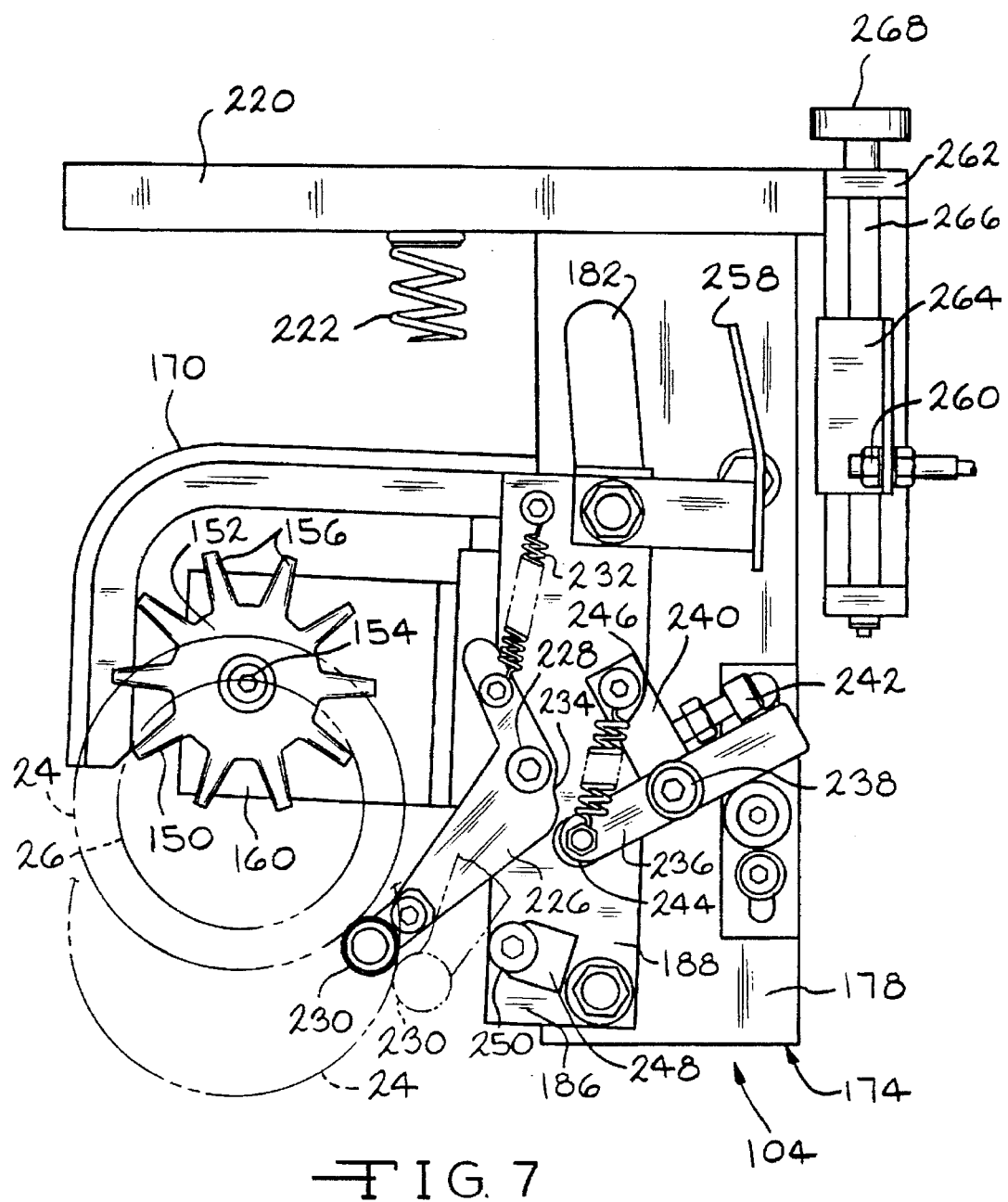
FIG. 7 is a top plan view of the forming tool and tracking device according to the present invention in which glassware moving along a predetermined path is shown in dashed lines.
Figure 8:
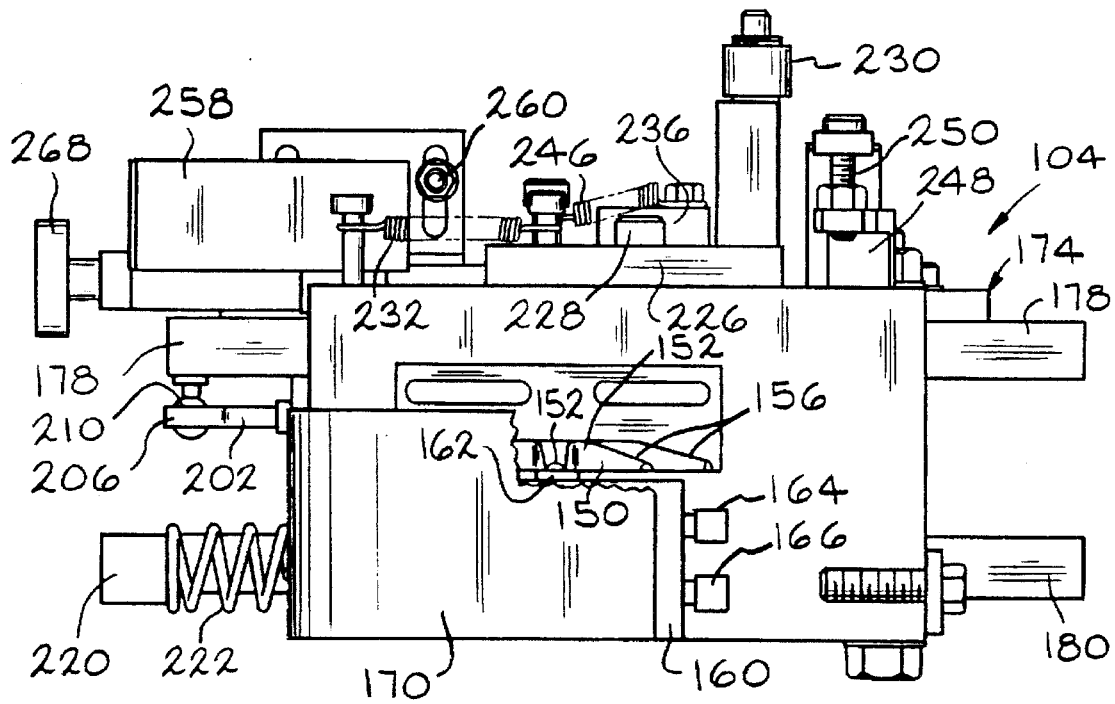
FIG. 8 is a side elevational view of the forming tool and tracking device according to the present invention.

Referring to FIGS. 6 through 8, the decorative pattern forming device 104 of the apparatus 10 including a forming tool 150. The forming tool 150 includes a disk 152 having a center 154. At least two forming fingers 156 extend outwardly in spaced relationship from the disk 152. In a preferred embodiment, the forming tool 150 includes ten fingers 156. It should be understood that the number of fingers 156 can vary depending on the decorative pattern being formed by the forming tool 150. In the preferred embodiment shown in the present drawings, the fingers 156 are rounded. It should be understood that the fingers 156 can have a variety of shapes depending on the decorative pattern to be formed. As shown in the present drawings, an example of a decorative pattern that can be formed with the forming tool 150 is a "scalloped" pattern.

Figure 11:
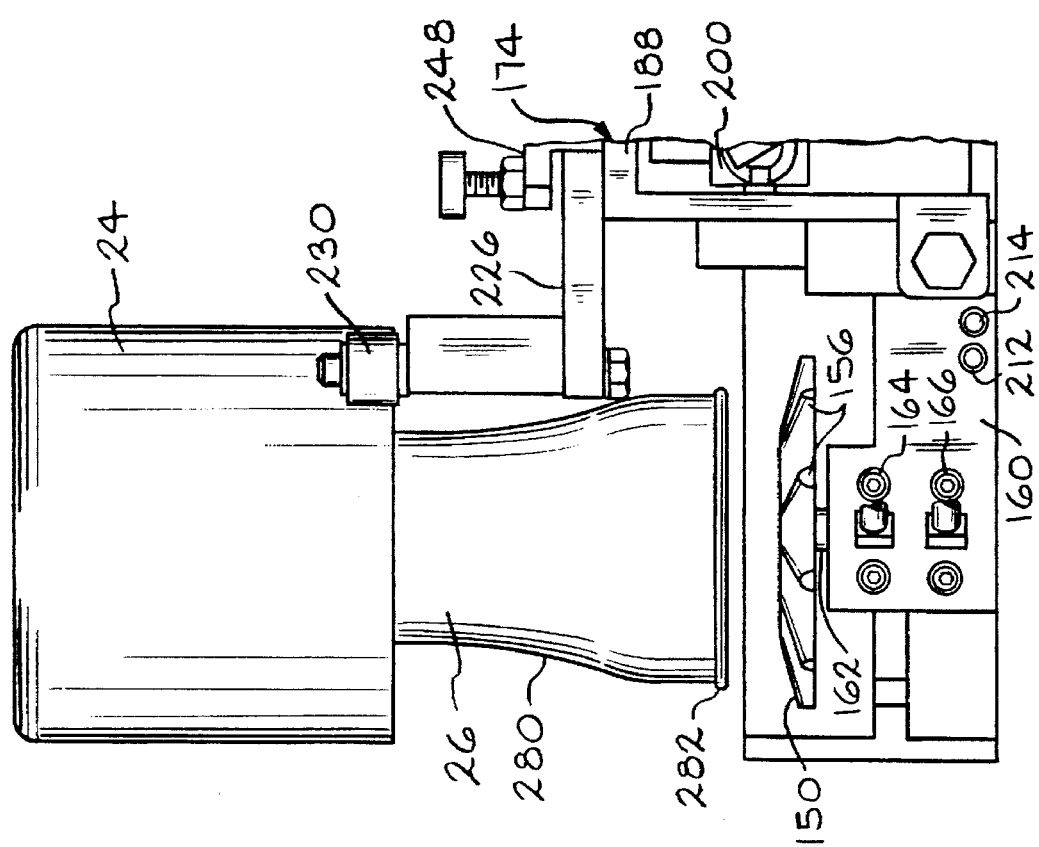
FIG. 11 is a view similar to the view of FIG. 9 in which the forming tool is in a second position to form a decorative pattern on the edge of the glassware.

As shown in FIG. 8, the forming tool 150 is mounted on a cylinder block 160 by a reciprocating shaft 162. The shaft 162 is attached to the center 154 of the disk 152. The cylinder block 160 includes a third inlet air fitting 164 that is in communication with the second air inlet fitting 128 of the controls assembly 106. A third exhaust air fitting 166 is in communication with the first exhaust air fitting 138 of the controls assembly 106. When the reciprocating shaft 162 is actuated by air movement within the cylinder block 160, the shaft moves the forming tool 150 from a first position as shown in FIG. 8 to a second position as shown in FIG. 11. Referring to FIGS. 7 and 8, a protective shield 170 protects the forming tool 150, the cylinder block 160 and the reciprocating shaft 162 from undesired contact by, for example, a vacuum chuck 24 of a spindle 14.

Figure 9:
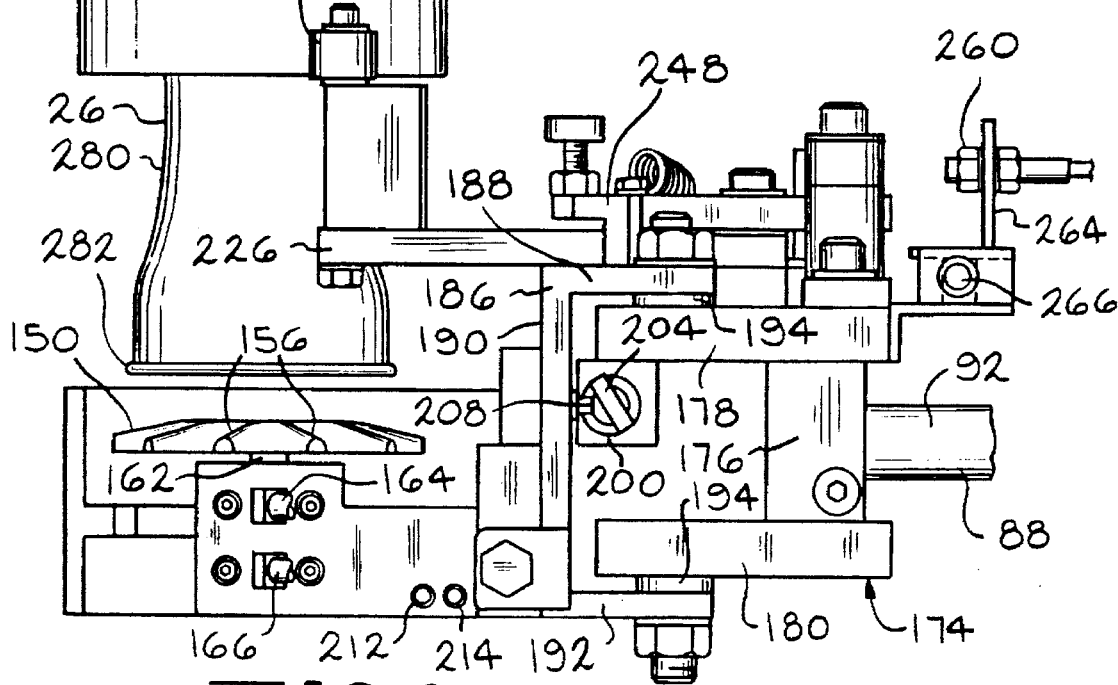
FIG. 9 is a side elevational view of the forming tool and tracking device according to the present invention in which a piece of glassware is positioned by a vacuum chuck of a moil burnoff spindle machine over the forming tool.

Referring to FIGS. 6 through 9, the decorative pattern forming device 104 includes a tracking device 174. As shown in FIG. 9, the tracking device 174 includes a tracking block 176 that is adjustably attached to the second ends 92 of the first and second shafts 86 and 88. The tracking connection block 176 is fixedly attached to an upper tracking plate 178 and a lower tracking plate 180. As shown in FIG. 6, the upper and lower tracking plates 178 and 180 each defines arcuately shaped openings 182. The openings 182 correspond to the arcuate configuration of the predetermined path P defined by the moil burnoff spindle machine 12.

Referring to FIGS. 6 through 9, the tracking device 174 includes a tracking base 186. As shown in FIG. 9, the tracking base 186 includes a top wall 188, a front wall 190 and a bottom wall 192. The top and bottom walls 188 and 192 each includes rollers 194 that are received by the arcuate openings 182 defined by the upper and lower tracking plates 178 and 180. The rollers 194 allow the tracking base 186 to be movably or slidably mounted on the upper and lower tracking plates 178 and 180.

Referring to FIGS. 8 and 9, a pneumatic return cylinder 200 is positioned between the upper and lower tracking plates 178 and 180. The cylinder 200 has a reciprocating rod 202 that includes a first ring end 204 and a second ring end 206. As shown in FIG. 9, the front wall 190 of the tracking base 186 includes a first attachment ball 208 that receives the first ring end 204 of the reciprocating rod 202. As shown in FIG. 8, the upper tracking plate 178 includes a second attachment ball 210 that receives the second ring end 206. As shown in FIG. 9, the return cylinder 200 is in communication with pressurized air from the return cylinder inlet fitting 126 through a second return cylinder inlet fitting 212 and a return cylinder exhaust fitting 214 that is positioned on the cylinder block 160. The return cylinder 200 is maintained at a constant pressure in the range from about 5 to about 6 pounds per square inch (p.s.i.). As described below, the return cylinder 200 can be actuated to cause the tracking base 186 to move with respect to the upper and lower tracking plates 178 and 180. As shown in FIGS. 6, 7 and 8, the lower tracking plate 180 is fixedly attached to a stop member 220 having a coiled spring 222. The coiled spring 222 engages the protective shield 170 to cushion the impact caused by the tracking device 174 as it is being moved by the return cylinder 200 during operation of the apparatus 10.

Referring to FIG. 6, 7 and 8, the tracking device 174 includes a follower arm 226 pivotally mounted by a pivot bolt 228 on the top wall 188 of the tracking base 186. The follower arm 226 includes a roller head 230 that rollingly engages the exterior surface of a vacuum chuck 24 as it travels along the decorative pattern forming device 104. The follower arm 226 is maintained in proper position by a follower spring 232 that is attached to the top wall 188. As shown in FIG. 7, the follower arm 226 defines a lock receiving recess 234.

Still referring to FIGS. 6 through 8, a locking arm 236 is pivotally mounted by a pivot bolt 238 that is attached to a mounting bracket 240 that extends from the top wall 188 of the tracking base 186. The position of the mounting bracket 240 and thus the position of the locking arm 236 can be adjusted by an adjustment screw 242 that is operatively connected to the mounting bracket 240. The locking arm 236 includes a rotating locking head 244. The locking head 244 is received in the recess 234 defined by the follower arm 226. The locking arm 236 is maintained in proper position by a locking spring 246. As shown in FIG. 6, the locking arm 236 urges the follower arm 226 and the roller head 230 against the vacuum chuck 24. The force of the vacuum chuck 24 against the roller head 230 causes the follower arm 226 to carry the tracking base 186 on the rollers 194 along the upper and lower tracking plates 178 and 180 along the arcuate path defined by the openings 182. Once the rollers 194 have reached the end of the travel defined by the openings 182, the force of the vacuum chuck 24 on the roller head 230 causes the follower arm 226 to pivot on the pivot bolt 228. This causes the locking head 244 to be forced from the lock receiving recess 234 of the follower arm 226 to allow the roller head 230 to move along the vacuum chuck 24 as described below.

As shown in FIGS. 7, 8 and 9, the tracking device 174 includes a follower arm retraction lock 248. The retraction lock 248 includes a clamping screw 250 that can be adjusted to engage the follower arm 226. When the follower arm 226 is positioned in the lock 248, the roller head 230 does not interfere with the vacuum chucks 24 as they travel along predetermined path P. The lock 248 can be used, for example, when the spindle machine 12 is rotating but the apparatus 10 is not in operation.

As shown in FIGS. 6 and 7, the forming tool 150 is adjustably mounted on the front wall 190 of the tracking base 186. During operation of the apparatus 10, the forming tool 150 is stationary with respect to the tracking base 186. Therefore, the forming tool 150 travels with the tracking base 186.

Referring to FIGS. 6 and 7, a photoeye sensing plate 258 is adjustably mounted on the top wall 188 of the tracking base 186. An electronic photoeye 260 is slidably mounted on a photoeye adjustment block 262 by a photoeye bracket 264. The photoeye 260 is in communication with the previously described fiber cable 118 of the controls assembly 106. The photoeye bracket 264 can be moved longitudinally with respect to the adjustment block 262 by a threaded screw drive 266 that is operatively connected to a photoeye adjustment knob 268. Movement of the knob 268 causes rotation of the screw drive 266 and thus movement of the photoeye bracket 264 and the photoeye 260. The photoeye 260 detects the presence of the sensing plate 258.

Figure 10:
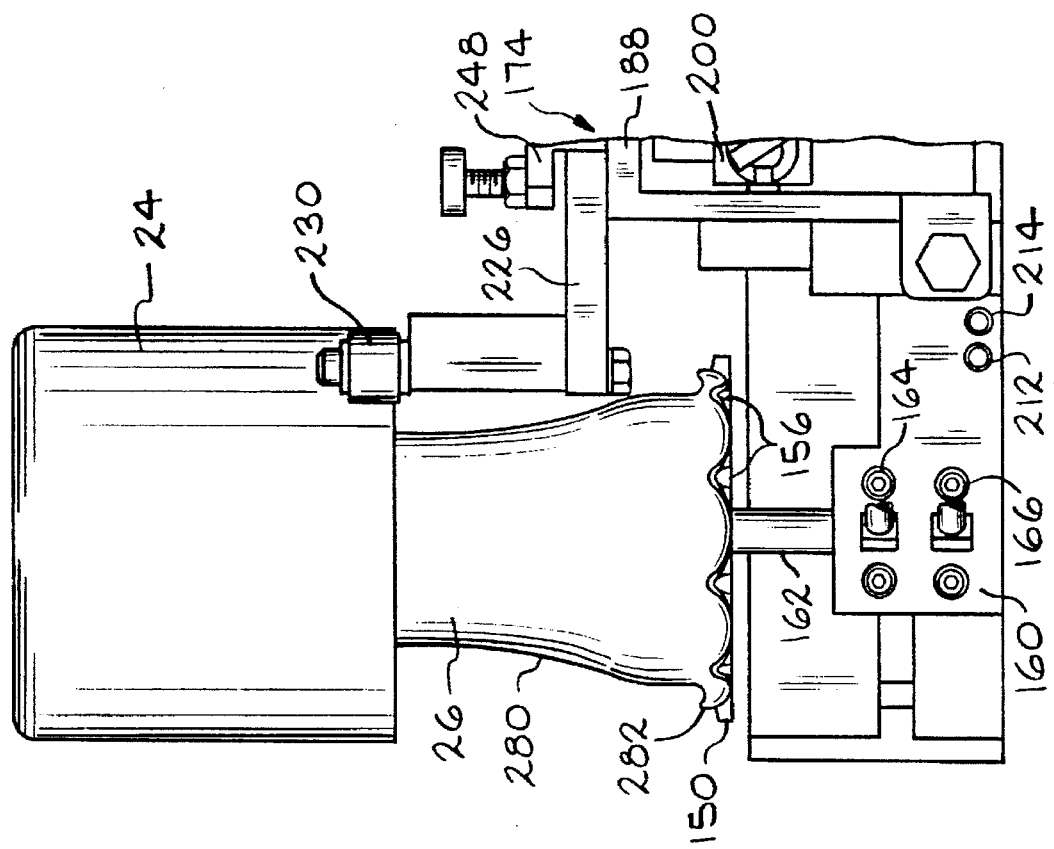
FIG. 10 is a view similar to the view of FIG. 9 showing the forming tool of the present invention in a first position.
Figure 12:
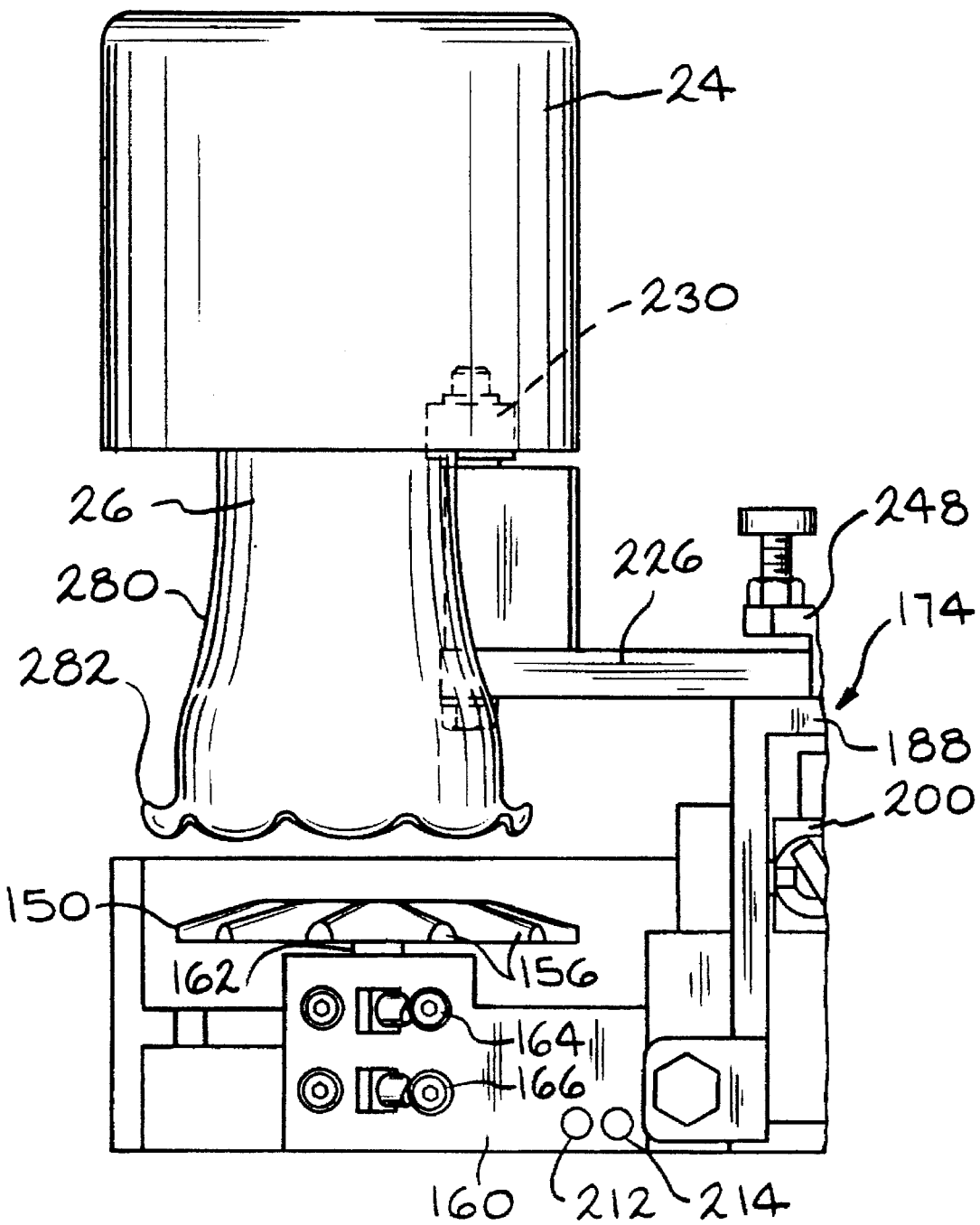
FIG. 12 is a view similar to the view of FIG. 9 showing the forming tool in the first position after a decorative pattern has been formed on the edge of the glassware.

Referring to FIGS. 6, 7 and 9 through 12, the operation of the apparatus 10 and the method of the present invention will be described. As shown in FIG. 6, pieces of glassware 26 are moved by vacuum chucks 24 in the direction indicated by the arrow along predetermined path P. As shown in FIG. 9, the glassware 26 includes a side wall 280 having an edge 282. As previously described, the side wall 280 and edge 282 have been sufficiently heated to cause them to become soft. The side wall 280 and edge 282 are heated prior to annealing of the edge. It has been found that the side wall 280 and the edge 282 should be heated to a temperature in the range from about 1500° F. to about 2000° F., with about 1800° F. being preferred. As shown in FIGS. 6 and 7, the roller head 230 of the follower arm 226 engages a vacuum chuck 24. This engagement cause the follower arm 226, which is locked by camming action by the locking head 244, to move with the vacuum chuck 24. The connection of the follower arm 226 to the tracking base 186 causes the tracking base to move in the direction of the vacuum chuck 24 as defined by the predetermined path P. As shown in FIG. 7, movement of the tracking base 186 results in the detection of the sensing plate 258 by the photoeye 260. The photoeye 260 sends a signal to the controls assembly 106, which causes pneumatic control valve 120 to open and send air under pressure through the fittings 124, 128 and 164 to the cylinder block 160. The air actuates the reciprocating shaft 162 causing the forming tool 150 to move from a first position as shown in FIG. 10 to a second position as shown in FIG. 11. When the forming tool 150 is in the second position, the forming fingers 156 engage the edge 282 of the glassware 26. This causes a decorative pattern, such as a scallop pattern, to be formed on the edge 282. The photoeye 260 sets a dwell time. Once the dwell time has expired, the controls assembly 106 Signals the pneumatic control valve 120 to exhaust air through fittings 166, 138 and 140. This results in retraction of the reciprocating shaft 162, which causes the forming tool 150 to be lowered from the second position as shown in FIG. 11 to the first position as shown in FIG. 12.

Referring to FIGS. 10 through 12, the roller head 230 of the follower arm 226 travels along the exterior surface of the vacuum chuck 24. When the vacuum chuck 24 has travelled past the roller head 230, as shown in FIG. 12, the follower arm 226 is repositioned by the pulling action of the follower spring 232. Once the follower arm 226 is in the start position, as shown in FIG. 6, the locking head 244 of the locking arm 236 is repositioned in the recess 234.

After the vacuum chuck 24 has travelled past the roller head 230, there is no force on the roller head in the direction of the predetermined path P. This causes the return cylinder 200, which is under a predetermined constant pressure, to move the tracking device 174 in the opposite direction of the predetermined path P. This repositions the tracking device 174 where the roller head 230 can engage a trailing vacuum chuck 24. The operation of the apparatus 10 can then be repeated.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense.

I claim:

1. An apparatus for forming a decorative pattern on glassware having an edge positioned adjacent a moil burnoff spindle machine including at least one spindle for holding said glassware, comprising:

a base;

a forming tool mounted on said base, said tool being movable between a first position and a second position, said tool engaging said edge of said glassware at said second position to form said decorative pattern on said edge;

actuating means for moving said tool from said first position to said second position;

control means for controlling said actuation means; and tracking means for causing said tool to follow said spindle.

2. The invention of claim 1, wherein said base includes adjustment means for positioning said forming tool in proper relationship with respect to said spindle machine.

3. The invention of claim 1, wherein said base includes pivot means for pivoting said forming tool away from said spindle machine.

4. The invention of claim 1, wherein said apparatus includes heater means for heating said edge of said glassware prior to engagement of said edge with said forming tool.

5. The invention of claim 4, wherein said apparatus includes spindle rotation means for causing rotation of said spindle adjacent said heater means.

6. The invention of claim 5, wherein said spindle rotation means includes at least one row of longitudinally extending pegs and at least one chain belt, said pegs and said belt engaging said spindle to rotate said spindle.

7. The invention of claim 1, wherein said forming tool includes at least two fingers for forming said decorative pattern.

8. The invention of claim 7, wherein said forming tool includes a disk, said fingers extending outwardly in spaced relationship from said disk.

9. The invention of claim 1, wherein said actuation means consists of a cylinder operatively connected to said forming tool.

10. The invention of claim 1, wherein said control means consists of a controls assembly having valve means in communication with said actuation means and sensing means in communication with said valve means.

11. The invention of claim 10, wherein said valve means consists of a pneumatic control valve.

12. The invention of claim 10, wherein said sensing means consists of a sensor module in communication with a photoeye positioned adjacent said forming tool.

13. The invention of claim 1, wherein said tracking means consists of a tracking device operatively connected to said forming tool, said tracking device including a roller head operatively connected to a follower arm pivotally attached to said tracking device, said roller head engaging said spindle to cause said tracking device and said forming tool to follow said spindle.

14. A method for forming a decorative pattern on glassware having an edge with an apparatus positioned adjacent a moil burnoff spindle machine including at least one spindle for holding said glassware, including the steps of:

(a) moving said glassware along a predetermined path defined by rotation of said spindle machine;

(b) heating said edge;

(c) tracking said spindle with tracking means as said glassware is being moved along said predetermined path; and (d) engaging said edge with a forming tool as said forming tool is being moved along said predetermined path to form said decorative pattern on said edge of said glassware.

15. The invention of claim 14, wherein said edge is heated to a temperature in the range from about 1500° F. to about 2000° F.

16. The invention of claim 14, wherein said decorative pattern is formed prior to annealing of said edge of said glassware.

17. The invention of claim 14, wherein said forming tool includes at least two fingers for forming said decorative pattern.

* * * * *